Figure 1:
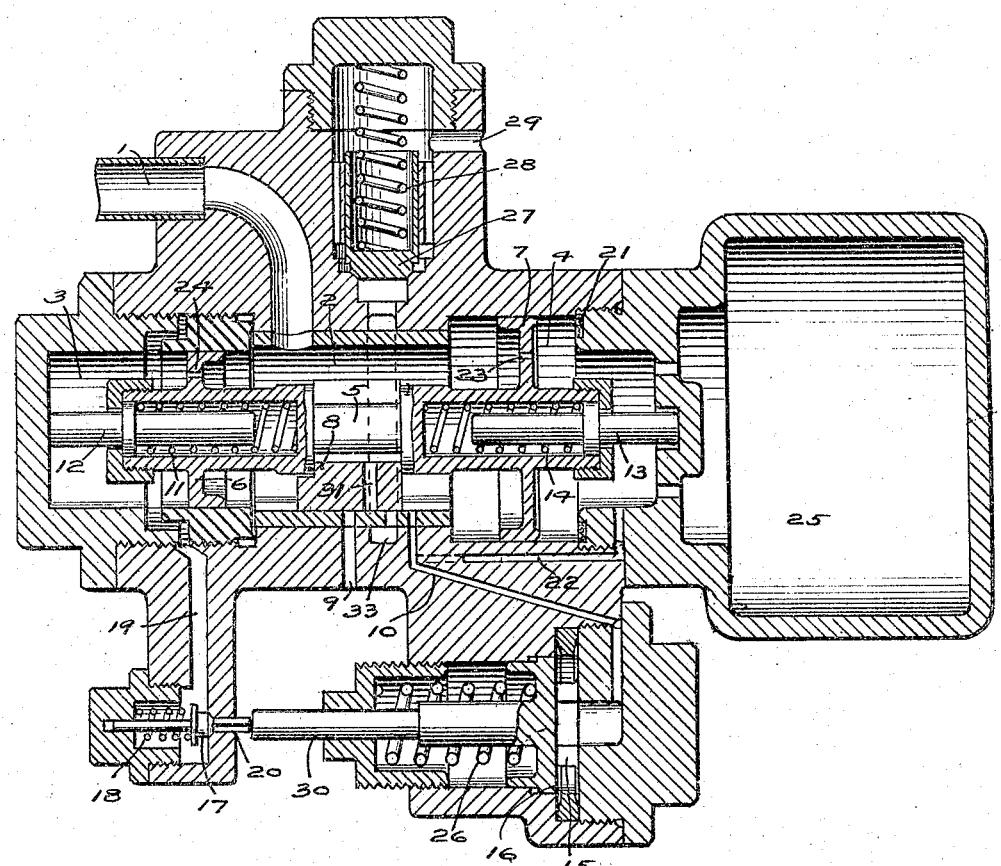

W. V. TURNER.
HIGH SPEED REDUCING VALVE FOR AIR BRAKES.
APPLICATION FILED MAY 26, 1905. RENEWED APR. 7, 1909.

937,394.

Patented Oct. 19, 1909.
2 SHEETS—SHEET 1.

WITNESSES

INVENTOR
Walter V Turner
by E. Wright
Att'y.

W. V. TURNER.
HIGH SPEED REDUCING VALVE FOR AIR BRAKES.
APPLICATION FILED MAY 26, 1905. RENEWED APR. 7, 1909.
937,394.
Patented Oct. 19, 1909.
2 SHEETS—SHEET 2.
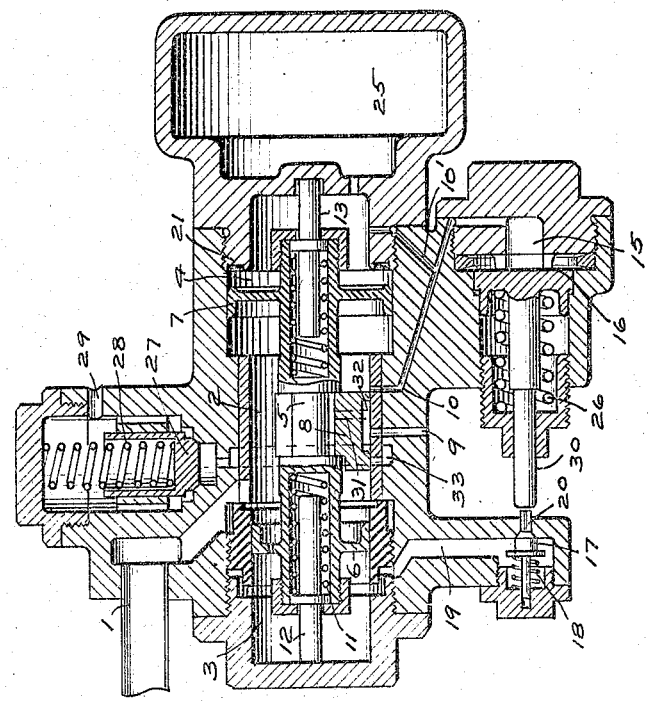
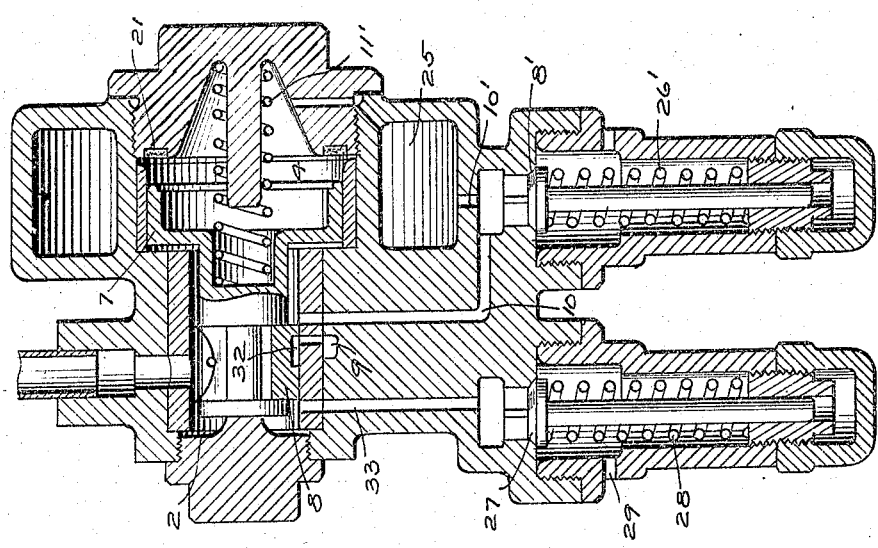
WITNESSES
INVENTOR
Walter V. Turner
by E. Wright
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

HIGH-SPEED REDUCING-VALVE FOR AIR-BRAKES.

937,394.  Specification of Letters Patent.   Patented Oct. 19, 1909.

Application filed May 26, 1905, Serial No. 262,414. Renewed April 7, 1909. Serial No. 488,486.

*To all whom it may concern:*

Be it known that I, WALTER V. TURNER, a citizen of the United States, residing in Wilkinsburg, in the county of Allegheny and State of Pennsylvania, have invented a certain new and useful Improvement in High-Speed Reducing-Valves for Air-Brakes, of which the following is a specification.

This invention relates to fluid pressure brakes, and more particularly to what is known as the high speed brake, in which a reducing or blow down valve is employed in connection with the brake cylinder for permitting the escape of air above a certain amount, and thereby limiting the brake cylinder pressure in service applications to a predetermined maximum degree, but operating in emergency applications to permit the accumulation of a higher degree of pressure in the brake cylinder, such as set forth in my prior pending applications, Ser. No. 191129, filed Jan. 29, 1904, and Ser. No. 223829, filed Sept. 9, 1904.

According to these prior devices, the brake cylinder pressure in service applications is limited to a predetermined safe degree, which will not ordinarily produce sliding of the car wheels even at very slow speed, while in emergency applications the full initial pressure that may be admitted to the brake cylinder is retained therein for a limited period of time and then blown down to the same predetermined degree which is maximum for service applications, the object being to hold the full initial brake cylinder pressure in emergency applications a sufficient period of time to effect a retardation or reduction in speed to such a rate that wheel sliding might be imminent and to then reduce the excessive brake cylinder pressure to the safe limit for ordinary low speeds. It has been found in practice, however, that when a train is running at a high rate of speed and the brakes are applied in emergency application, a much higher brake cylinder pressure may be maintained and for a longer period of time than it was at first supposed without danger of causing a sliding of the wheels, and one of the objects of my present invention is to provide an improved valve device which will operate to hold a higher resultant brake cylinder pressure in emergency applications than in service applications.

Another object is to provide an improved valve device which may be readily adjusted to give any result desired, such as to hold the full brake cylinder pressure continuously in emergency applications, or to hold the full initial brake cylinder pressure a predetermined time and then to blow down to a certain degree which shall be greater to any desired extent than the predetermined maximum to which the brake cylinder pressure is limited in service applications.

Figures 2, 3:
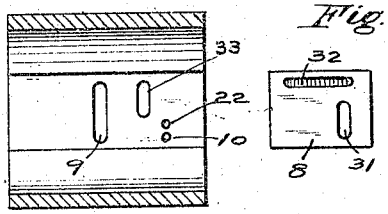

In the accompanying drawings, Figure 1 is a vertical section illustrating one form of valve device embodying my improvements; Fig. 2 a plan view of the slide valve seat; Fig. 3 a face view of the slide valve; Fig. 4 a vertical section showing a modified form of valve device; and Fig. 5 a vertical sectional view showing still another modification.

According to the preferred construction, as shown in Fig. 1, the valve device comprises a casing having an inlet 1 communicating with the brake cylinder, a valve chamber 2, piston chambers 3 and 4, containing pistons 6 and 7 on stem 5 for operating the slide valve 8. Springs 11 and 14, with stems 12 and 13 operate to normally hold the pistons and valve in the central position, as shown. A normally open port 10 leads from the valve seat to diaphragm chamber 15 having diaphragm 16 with adjustable spring 26 and stem 30 for operating the vent valve 17 which controls the flow of air from the chamber 3 through passage 19 and port 20 to the atmosphere. Chamber 25 communicates with chamber 4 back of piston 7 in order to furnish the desired volume, and a normally open by-pass port 22 establishes communication around the piston, but is adapted to be closed by the movement of the device in emergency applications when the piston 7 seats against its gasket 21. A restricted port 23 is provided for gradually equalizing the brake cylinder pressure into chamber 25. Air from the brake cylinder is adapted to leak around the loosely fitting piston 6, or a very small port 24 may be made through the piston for this purpose. The outlet port 9 is controlled by slide valve 8, having a port 31 adapted to register with the outlet port in a certain position of the valve, and an additional port 33 may be provided leading to a spring seated valve 27 governing an outlet port 29 to the atmosphere. By adjusting the spring 28 the valve 27 may be set to hold any desired degree of pressure in the brake cylinder when the port 33 is open.

The operation of this form of my improvement is as follows:—When a service application of the brakes is made, air under pressure from the brake cylinder flows through pipe 1 into the valve chamber 2. The rate of increase in the brake cylinder pressure in service applications is limited by the capacity of the service port of the triple valve and the capacity of the by-pass ports 22 and 23 is sufficient to permit the pressure to equalize into the chambers 4 and 25 without moving the piston 7. The pressure also equalizes around the piston 6 and through port 24 into chamber 3, so that the pressure rises in all parts of the valve device at substantially the same rate as that of the brake cylinder and no movement of the valve occurs in service applications until the pressure acting through passage 10 and in diaphragm chamber increases to the point for which the spring 26 is adjusted. If a higher pressure than this be admitted to the brake cylinder the diaphragm 16 will be forced outward, compressing spring 26 and moving the stem 30 and vent valve 17 to open the port 20, thereby producing a reduction in pressure in the chamber 3 and causing the movement of the piston 6 and slide valve 8 to bring port 31 in register with outlet port 9. This port remains open as long as air pressure in excess of that for which the spring 26 is adjusted continues to be supplied to the brake cylinder, and thereby limits the brake cylinder pressure in service applications to this predetermined degree. When the triple valve cuts off the supply to the brake cylinder and the pressure therein diminishes slightly the spring 26 moves the stem 30 away from the valve 17 and permits the spring 18 to close the same, whereupon the pressure instantly equalizing upon opposite sides of the piston 6, the spring 11 expands and moves the piston and slide valve back to normal position, thereby closing the outlet port 9. To the extent just described this portion of the valve device might be said to comprise a safety valve of the slide valve type for limiting the brake cylinder pressure to a predetermined amount, since the emergency piston 7 remains inert and performs no function in service applications.

In emergency applications the pressure as admitted to the brake cylinder increases much more rapidly than in service and much faster than it can equalize around the piston 7 through ports 22 and 23, consequently as the piston 7 is of larger diameter than piston 6 it is instantly carried over to its seat against gasket 21, thereby moving the valve 8 to close ports 10 and 22 and hold outlet port 9 also closed. In this position air under pressure from the brake cylinder feeds slowly through the restricted port 23 into the chamber 25 until the pressure therein substantially equalizes, and this requires a predetermined period of time during which the high pressure is held in the brake cylinder. A cavity 32 may be provided in the face of the valve 8 for connecting the port 10 with the outlet port 9 and the atmosphere in this position of the valve for the purpose of preventing the accumulation of pressure in the diaphragm chamber 15 due to accidental leakage or other cause. When the pressure equalizes upon the piston 7, the spring 14, which was compressed by the first movement of said piston, now expands and moves the pistons and slide valve back to normal position, but as this operates to open port 10 and admit the excessively high brake cylinder pressure into diaphragm chamber 15, the diaphragm 16 instantly compresses spring 26 and opens wide the vent valve 17. This sudden venting of chamber 3 back of piston 6 causes the movement of said piston and slide valve to its extreme outer position, in which the stem 5 strikes the stem 12 and spring 11 is compressed to its maximum. According to the construction disclosed in my prior application, Ser. No. 223829, above referred to, this movement of the valve served merely to open the outlet port 9 and discharge the excess of brake cylinder pressure to the atmosphere. In this present device, however, the stem 12 permits the port 31 in the valve to travel over the port 9 so as to again close the same and prevent further escape of air from the brake cylinder. Substantially the full braking pressure is thereby retained in the brake cylinder except the escape due to leakage past the piston 6 and out at port 20. In this manner substantially the full maximum degree of brake cylinder pressure may be retained throughout the full period of the stop. If it is not desired to retain this full maximum pressure the entire period, but to gradually diminish the pressure after the predetermined interval, then the port 31 may be so located or, what amounts to the same thing, the length of stem 12 may be so adjusted as to permit the port 9 to be slightly open in this extreme position of the valve, thus allowing the brake cylinder pressure to gradually reduce to that for which the spring 26 is set, whereupon the valve 8 returns to its normal position and closes the outlet port 9, as before described. If it be desired to retain a final brake cylinder pressure of a greater or less higher degree in emergency applications than in full service applications, the port 33 and spring seated valve 27 may be provided for this purpose, the port 33 being so located as to be opened by the slide valve in emergency applications. The spring 28 may be adjusted to hold any desired degree, say 75 pounds per square inch, in the brake cylinder, or if it be desirable to hold the full maximum pressure it will be evident that this may readily be done by merely setting the spring to a higher degree of tension.

As shown in Fig. 1, the port 33 is closed by the valve 8 during the predetermined initial period of the emergency application and is then opened when the valve moves to its extreme opposite position and outlet port 9 is closed. In this case the brake cylinder pressure will then blow down to the higher degree of pressure for which the spring 28 is adjusted, which pressure will then be retained during the remainder of the stop except for the slight reduction due to leakage around the piston 6 and through ports 19 and 20 to the atmosphere.

According to the modification shown in Fig. 4, when the piston and valve are shifted to the extreme right position by the sudden rise in brake cylinder pressure in emergency applications the space 4 on the outer side of piston 7 is placed in communication with the atmosphere through ports 10', 10, 32 and 9, so that the valve remains in this position with the port 33 open leading to spring pressed valve 27 as long as there is pressure in the brake cylinder. The tension of the spring 28 therefore determines the degree of pressure to which the brake cylinder is blown down in emergency applications, while the adjustment of spring 26 determines to what degree the brake cylinder pressure is limited in service applications, consequently these pressures may be independently adjusted to give any desired result.

In service applications, the device as shown in Fig. 4 operates substantially as before described, but the restricted port 23 is omitted from piston 7 in order to prevent any escape of air through this piston when the same is seated against the gasket in emergency applications.

In the construction shown in Figs. 1 and 4, the diaphragm with its adjustable spring and vent valve, piston 6 and slide valve 8 comprise the safety valve or blow off part of the device for limiting the brake cylinder pressure to a predetermined degree in service applications, while the piston 7 with the slide valve 8 comprise the emergency feature of the device for cutting out of action the low pressure blow off device in emergency applications, the slide valve 8 being conveniently arranged to serve as a part of both of these features. It will also be evident that these features may be separately arranged, and that any desirable or common form of low pressure blow off valve may be used in lieu of the slide valve type. Such an arrangement is shown in Fig. 5, in which an ordinary blow off valve 8' having an adjustable spring 26' is connected by port 10 to the valve chamber 2, and the emergency piston 7 with its valve 8 is adapted to cut off communication from the brake cylinder and chamber 2 to the port 10 and the low pressure blow off valve 8' in emergency applications. According to this construction the port 33 leading to the high pressure blow off valve 27 is constantly open and in communication with the brake cylinder, but will perform no function in service applications since the valve 8' discharges the excess of air pressure and does not permit the same to rise sufficiently high to open the valve 27. As the pressure readily equalizes from the valve chamber 2 through ports 10 and 10' to chambers 25 and 4 on the opposite side of piston 7 in service applications the spring 11' holds the piston and slide valve in the normal position with port 10 open so that the brake cylinder pressure is limited to the degree for which the spring 26' of the low pressure blow off device is adjusted. In emergency applications the rapid rise in brake cylinder pressure seats the piston 7 against its gasket and moves valve 8 to cut out the low pressure device and open communication from the space 4 on the outer side of piston 7 to the atmosphere through ports 10', 10, 32 and 9. The brake cylinder pressure is then governed by the high pressure blow off valve 27 and may be blown down more or less slowly, as desired, by adjusting the size of the ports, as will be readily understood.

It will now be apparent that by means of my improvements the brake cylinder pressure may be limited to a predetermined amount in service applications, while in emergency applications the full maximum pressure may be retained throughout the entire period of the stop, or may be retained for a predetermined interval and then gradually reduced either to the maximum degree allowed in service applications or to a degree more or less greater than this, or may be gradually reduced to said higher degree of resultant pressure without a predetermined time interval of full maximum pressure.

Having now described my invention, what I claim as new and desire to secure by Letters Patent is:—

1. A high speed valve device for air brakes, comprising a blow off mechanism for limiting the brake cylinder pressure to a predetermined degree in service applications, and means operating in emergency applications for retaining a higher ultimate degree of brake cylinder pressure.

2. A high speed valve device for air brakes, comprising a blow off mechanism for limiting the brake cylinder pressure to a predetermined degree in service applications, and means operated by the rapid increase in brake cylinder pressure in emergency applications for retaining a higher ultimate degree of brake cylinder pressure.

3. A high speed valve device for air brakes, comprising a valve mechanism for limiting the brake cylinder pressure to a predetermined degree in service applications, and means operating in emergency applications for retaining a higher ultimate degree of brake cylinder pressure.

4. A high speed valve device for air brakes, comprising a low pressure blow off valve mechanism for limiting the brake cylinder pressure to a predetermined degree in service applications, and means operating in emergency applications for cutting out said low pressure valve mechanism and for retaining a higher ultimate degree of pressure in the brake cylinder.

5. A high speed valve device for air brakes, comprising a low pressure blow off valve mechanism for limiting the brake cylinder pressure to a predetermined degree in service applications, and means operated by the rapid rise in brake cylinder pressure in emergency applications for cutting the said low pressure valve mechanism out of action and for retaining a higher ultimate degree of pressure in the brake cylinder.

6. A high speed valve device for air brakes, comprising a low pressure blow off valve mechanism normally subject to brake cylinder pressure, a high pressure blow off valve device, and means operating in emergency applications for cutting out of action said low pressure valve and for cutting out said high pressure valve for a limited period of time.

7. A high speed valve device for air brakes, comprising a low pressure blow off valve mechanism normally subject to brake cylinder pressure, a high pressure blow off valve device, and means operated by the rapid rise in brake cylinder pressure in emergency applications for cutting out said low pressure valve, and for closing communication from the brake cylinder to the high pressure valve for a limited period of time and then opening said communication.

8. A high speed valve device for air brakes, comprising a valve for controlling an outlet from the brake cylinder, a piston for operating said valve, an adjustable diaphragm normally subject to brake cylinder pressure, a valve operated by said diaphragm for controlling the pressure upon one side of said piston, and means operating in emergency applications for closing communication from the brake cylinder to said diaphragm and opening communication from said diaphragm to the atmosphere.

9. A high speed valve device for air brakes, comprising a valve for controlling an outlet from the brake cylinder, a piston for operating said valve in one direction to open said outlet, and by a further movement in the same direction to close said outlet, an adjustable diaphragm valve mechanism subject to the brake cylinder pressure for controlling the pressure on one side of said piston.

10. A high speed valve device for air brakes, comprising a valve for controlling an outlet from the brake cylinder, a piston subject to the brake cylinder pressure for moving said valve in one direction to open said outlet, and by a further movement in the same direction to close said outlet, a vent valve for controlling the release of pressure from one side of said piston, and a diaphragm subject to brake cylinder pressure for operating said vent valve.

11. A high speed valve device for air brakes, comprising a valve for controlling an outlet from the brake cylinder, a piston for operating said valve in one direction to open said outlet, and by a further movement in the same direction to close said outlet, an adjustable diaphragm valve mechanism normally subject to brake cylinder pressure for controlling the pressure on one side of said piston, and means operating in emergency applications for temporarily cutting off said diaphragm from the brake cylinder pressure.

12. A high speed valve device for air brakes, comprising a valve for controlling an outlet from the brake cylinder, a piston for operating said valve in one direction to open said outlet, and by a further movement in the same direction to close said outlet, an adjustable diaphragm valve mechanism normally subject to brake cylinder pressure for controlling the pressure on one side of said piston, and a piston operated by the rapid rise in brake cylinder pressure in emergency applications for moving said main valve in the opposite direction for temporarily closing communication from the brake cylinder to said diaphragm and then opening said communication.

In testimony whereof I have hereunto set my hand.

WALTER V. TURNER.

Witnesses:
R. F. EMERY,
J. B. MACDONALD.